(12) United States Patent
Bernstein et al.

(10) Patent No.: US 6,501,578 B1
(45) Date of Patent: Dec. 31, 2002

(54) APPARATUS AND METHOD FOR LINE OF SIGHT LASER COMMUNICATIONS

(75) Inventors: Ralph Bernstein, Los Altos; Thomas M. Chaffee, Los Angeles, both of CA (US); Jean-Claude Diels, Albuquerque, NM (US); Karl Stahlkopf, San Francisco, CA (US)

(73) Assignees: Electric Power Research Institute, Inc., Palo Alto, CA (US); The University of New Mexico, Albuquerque, NM (US)

(*) Notice: Subject to any disclaimer, the term of this patent is extended or adjusted under 35 U.S.C. 154(b) by 0 days.

(21) Appl. No.: 09/215,420

(22) Filed: Dec. 18, 1998

Related U.S. Application Data

(60) Provisional application No. 60/068,184, filed on Dec. 19, 1997.

(51) Int. Cl.[7] .............................................. H04B 10/00
(52) U.S. Cl. ........................ 359/154; 359/159; 359/109
(58) Field of Search ................................ 359/130, 193, 359/159, 180, 154, 109

(56) References Cited

U.S. PATENT DOCUMENTS

| | | | | |
|---|---|---|---|---|
| 4,655,547 A | * | 4/1987 | Heritage et al. ....... 350/162.12 |
| 4,866,730 A | * | 9/1989 | Szatmari et al. ............ 372/101 |
| 5,095,487 A | * | 3/1992 | Meyerhofer et al. .......... 372/23 |
| 5,142,400 A | * | 8/1992 | Solinsky ..................... 359/159 |
| 5,177,630 A | * | 1/1993 | Goutzoulis et al. ......... 359/135 |
| 5,573,721 A | * | 11/1996 | Gillette ........................ 264/401 |
| 5,852,620 A | * | 12/1998 | Wan ............................ 372/22 |
| 5,867,290 A | * | 2/1999 | Dutt et al. ................... 359/115 |
| 5,907,421 A | * | 5/1999 | Warren et al. .............. 359/180 |

* cited by examiner

Primary Examiner—Jason Chan
Assistant Examiner—Christina Y. Leung
(74) Attorney, Agent, or Firm—Flehr Hohbach Test Albritton & Herbert LLP

(57) ABSTRACT

A line of sight laser communication system includes a laser to generate a laser signal with femtosecond pulses. A first grating spectrally disperses the femtosecond pulses of the laser signal. A programmable mask converts the femtosecond pulses of the laser signal into coded words. A second grating spectrally recombines the coded words of the laser signal. A telescope then launches the laser signal. The launched laser signal is received at a receiving telescope. A second laser generates a set of reference pulses. A non-linear crystal combines the set of reference pulses and the laser signal to create an output signal only when the laser signal and the reference pulses temporally coincide. A camera records the output signal.

6 Claims, 2 Drawing Sheets

APPARATUS AND METHOD FOR LINE OF SIGHT LASER COMMUNICATIONS

This application claims priority to the provisional patent application entitled, "Apparatus and Method for Line of Sight Laser Communications", Ser. No. 60/068,184, filed Dec. 19, 1997.

BRIEF DESCRIPTION OF THE INVENTION

This invention relates generally to data communications. More particularly, this invention relates to a technique for line of sight laser communications.

BACKGROUND OF THE INVENTION

Current line of sight communications use microwave technologies, and some communications work has been done with laser technology. Solid state fiber lasers have been developed for commercial communication applications. Picosecond pulses (ca 50 ps) are currently being used for long distance (transpacific) soliton communication. Much shorter pulses (<100 Fs) have been generated with fiber sources, pumped by diode lasers. Such systems have the advantages that they are being tailored for communications, the bandwidth that is used is at an "eye safe" wavelength, and fast modulation techniques have been or are being developed. There is still work to be done, but the fact that the light is confined to a narrow waveguide helps improve the speed of modulation. The disadvantages of such systems is that they have a lossy transition from fiber to air, they have a larger diffraction angle at longer wavelengths, the minimum size beam at 20 km is about 10 m, there is a low average and peak power (pJ/pulse), and a low repetition rate (1 to 10 MHz) exists.

Solid state Nd vanadate lasers (Nd:YVO_4) have also been used in prior art communication systems. These diode pumped lasers produce a train of pulses of about 5 ps duration (which could be compressed externally to the laser to 100 fs). The repetition rate is typically 100 MHz. The advantage of systems of this type are high efficiency, high average power-up to 100W in an infrared beam, 20W in the green, which can be frequency-tripled to a wavelength of 355 nm. The typical pulse energy in the green is 0.2 uJ/pulse. Pump diodes for this type of laser have a long lifetime; they are actively under development and they are relatively cost effective. In addition, these systems can provide diffraction limited beams in the green and UV. For the green, the minimum spot size at 20 km is about 2 m. For the UV, the minimum spot size at 20 km is about 1.5 m.

Solid state Cr:LiSAF Lasers (also Cr:LiSGAF and Cr:LiCAF) have been proposed for communication systems. Tunable pulse generation in the range of 820 nm to 880 nm has been demonstrated. Pulse duration as short as 20 fs has been obtained, but at very low average power. A maximum average power has been demonstrated at 1.1W, for continuous operation, while short pulse operation is only 0.5W. Advantageously, these systems have shorter pulses directly out of the laser, without compression. In addition, they have a shorter wavelength. The disadvantages of these systems is that they have less efficient pump diodes and less average power.

Ultra-high power laser pulses have also been proposed for data communications. It is possible to generate a stream of femtosecond pulses, each having a duration of less than 20 fs, and an energy of 10 mJ, at a repetition rate of up to 1 KHz. These sources are at 800 nm, can be frequency-tripled to 270 nm. The present costs are high. The average power is 10W. The information is stored in "words" coded in strings of pulses following the main filament forming pulse. The advantages of ultra-high power laser pulses include the fact that the laser pulses collapse in filaments of less than 100 um diameter, the filaments propagate through the atmosphere independently of atmospheric distortion or turbulence, and the spot size is <100 um, so it is impossible to intercept without interrupting communication. In addition, there is back and forward scattered white light that is generated in the filament. This radiation can be detected both at the emitter and receiver. (It is this white "conical radiation" that has been detected at the source, for a propagation distance of 11 km). The disadvantage of these systems are their high costs, research is needed to establish its utility, and, if successful, the military may classify the technology. How long the channel will live is unknown. Channel life determines the length of the word that can follow the main pulse. How long the filament can be stable is also unknown.

SUMMARY OF THE INVENTION

The invention is a line of sight laser communication system with a laser to generate a laser signal with femtosecond pulses. A first grating spectrally disperses the femtosecond pulses of the laser signal. A programmable mask converts the femtosecond pulses of the laser signal into coded words. A second grating spectrally recombines the coded words of the laser signal. A telescope then launches the laser signal. The launched laser signal is received at a receiving telescope. A second laser generates a set of reference pulses. A non-linear crystal combines the set of reference pulses and the laser signal to create an output signal only when the laser signal and the reference pulses temporally coincide. A camera records the output signal.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION THE INVENTION

Figure 1:
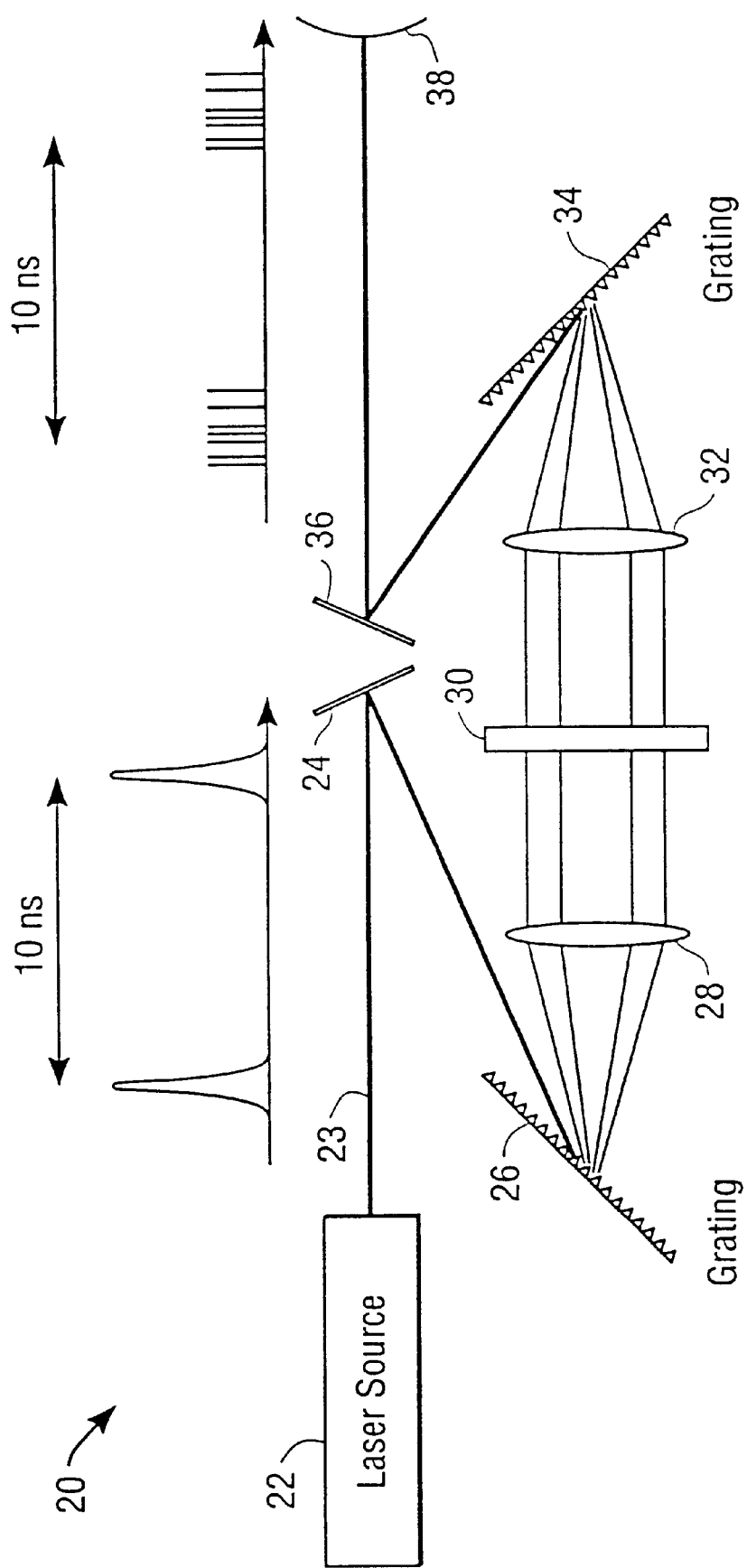
FIG. 1 illustrates a line of sight laser communication emitter in accordance with an embodiment of the present invention.

FIG. 1 illustrates a line of sight laser communication emitter 20 constructed in accordance with an embodiment of the invention. The apparatus 20 includes a laser source 22 that emits a laser beam 23 as a train of femtosecond ($1 \times 10^{-15}$ sec) pulses at a rate of 100 MHz (10 NS between pulses). The pulses are redirected by a mirror 24 and then spectrally dispersed by a first grating 26. They then pass through a lens 28 and enter a programmable mask 30, which converts the pulses into "words" or coded sequence of pulses. The pulses are routed through a lens 32 and are then spectrally recombined by a second grating 34 before being reflected through a mirror 36 and being launched by a telescope 38.

Figure 2:
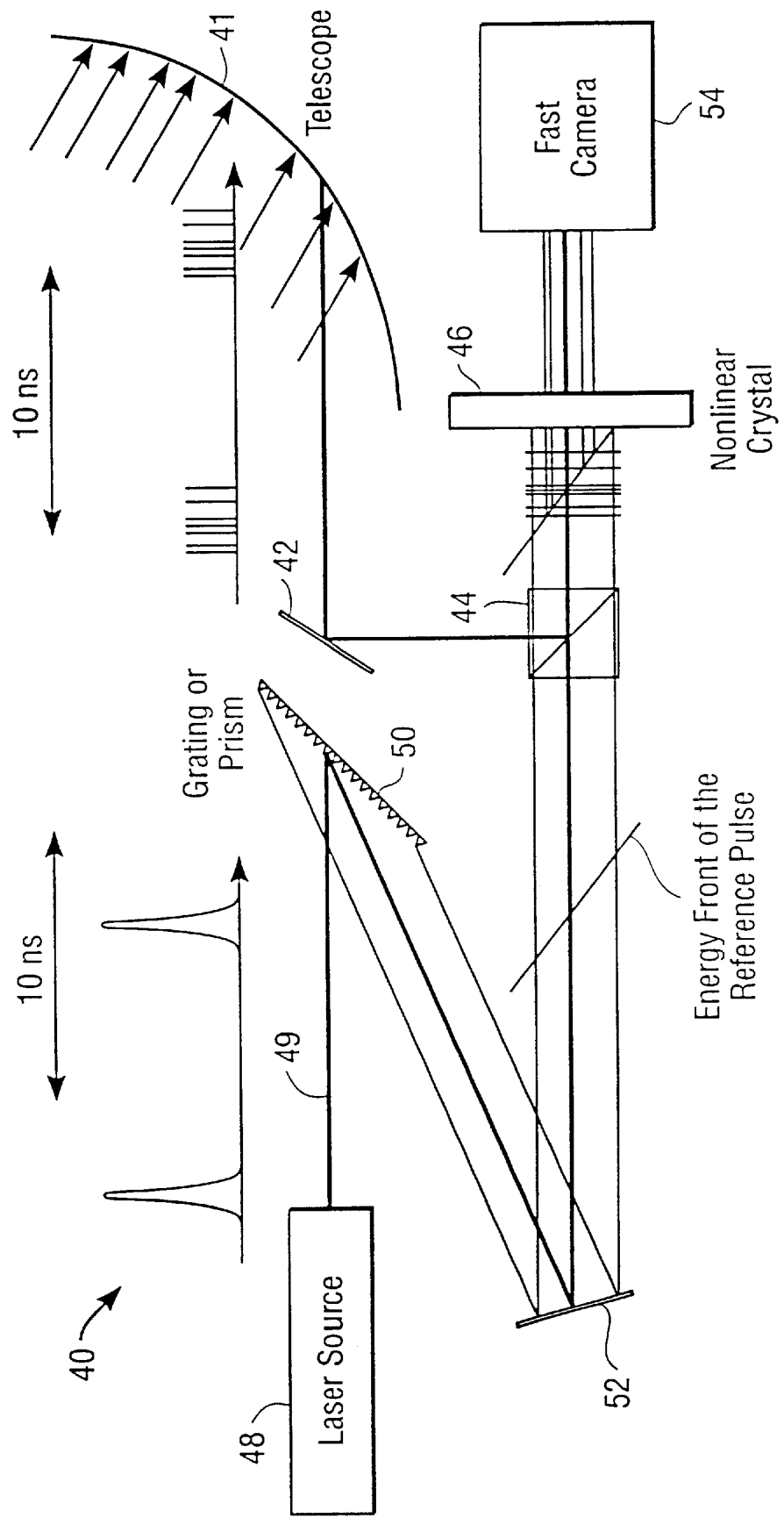
FIG. 2 illustrates a line of sight laser communication receiver in accordance with an embodiment of the present invention.

FIG. 2 illustrates a line of sight laser communication receiver 40 constructed in accordance with an embodiment of the invention. The apparatus 40 includes a receiving telescope 41 to receive the signal from emitter 20. The input signal is reflected with a mirror 42 into a polarizing beam splitter 44. The signal is then routed to a non-linear crystal 46, where it is combined with a signal from laser 48. Laser 48 applies a laser beam 49 to grating 50. The signal is then reflected by mirror 52 into the non-linear crystal 46. The signal from the laser 48 is a set of pulses that operate at the same repetition rate as the input signal from the telescope 41. The grating 50 or prisms are used to spatially delay the reference pulses from the reference laser 48. The non-linear crystal 46 only generates light when the reference light and the signal temporally coincide. Since the time of arrival of the reference light is "sloped" in the plane of the figure, the temporal sequence of the signal is transformed in a transverse pattern recorded by a fast camera 54.

Thus, the invention provides focused femtosecond laser technology for very high speed and secure point-to-point communications. The technique of the invention provides a magnitude greater bandwidth than existing point-to-point communications technologies.

Pulse shaping techniques are known in the art. The techniques enable one to transform a single femtosecond pulse into a pulse train spanning 50 ps. The pulse spectrum is spread out and modulated with a mask.

An array of microlenses may be used to focus portions of the beam into micro-electro-optic modulators, then back to microlenses and the main beam. The "length" of the word that can be carried at every period is determined by the spectral resolution of the system. The present technical challenge is to refresh the word every period (10 NS). An alternative is to use successive periods for multiplexing.

The most obvious method of detection is to repeat at the receiving end what is being done at the emitter. That is, the spectrum of each word is displayed and read. Another method is to use single shot cross-correlations to read the 50 ps pulse sequence. What is then required at the detection end is a similar source, synchronized with the emitter.

Some signal is required to identify the beginning of each "word". One possibility (if the basic period is the pulse repetition rate of 100 MHz) is to use the infrared pulse for synchronization, and the visible and UV pulses for the signal to be transmitted.

One needs first some means to separate the main filament forming pulse from the signal. One solution is to use a different optical frequency for the two.

Another challenge is to protect the detector. A filament of a few mJ at 1 KHz will destroy any detector. One possibility to investigate is to deflect the filament with a spinning diamond window (minimum spin rate 10 turns/s). Another one is a liquid jet (ethylene glycol). The filament will diffract after the liquid jet.

There are a number of benefits associated with the invention. First, the invention provides a method of creating any wireless optical (laser) based communications link, using pulse code modulation with trains of femtosecond pulses unaffected by atmospheric diffraction (such as line-of-sight) using EPRI's established technology of lightning strike redirection. That is, the present invention uses the technology of U.S. Pat. No. 5,175,664, which is expressly incorporated by reference herein. The lightning strike redirection technology of the '664 patent is used such that the physics of lightning stroke "leader phase" is mimicked through the creation of an ionized "corridor" through the earth's atmosphere with low power lasers to facilitate a laser onto which data of any kind is modulated as a carrier frequency. The invention provides a method of using filaments created by intense ultrashort pulses to guide the optical (pulse coded) signal for communication.

The invention is also advantageous because it uses optical amplifiers as repeaters. The invention contemplates the inclusion of a system of exploiting the Quasi-Periodicity in Nonlinear Optics to effect frequency doubling and frequency adding. Structures that repeat not on the basis of rational numbers, such as crystals, but that repeat on the basis of irrational ratios, are quasi-periodic. It has been shown that the formation of layers of a nonlinear optical material, lithium tantalate, with a quasi-periodic (Fibonacci) sequence is useful in generating third-harmonics of laser light. The availability of more wave vectors in such a lattice allows the coupling of two processes, frequency doubling and frequency adding, so that the normally weak third harmonics can be generated efficiently. The invention uses quasi periodic sequences to generate third harmonics of the laser, in order to have a less diffracting beam.

The invention can be advantageously used along the rights-of-way currently managed and/or owned by the utilities around the world. The communications bandwidth, limited only by the bandwidth of the laser and the femtosecond pulses, is expected to be several orders of magnitude greater bandwidth than conventional microwave communications systems.

The laser communications systems will be extremely secure, virtually impossible to "tap" into because of the unique nature of the laser signal and the narrowness of the laser beam. The laser system can be made inherently safe. When the emitter pulses are interrupted by any obstacle, the system can be designed to shut down.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

What is claimed is:

1. A line of sight laser communication system comprising:
   a first laser to generate a laser signal with femtosecond pulses;
   a first grating to spectrally disperse said femtosecond pulses of said laser signal;
   a programmable mask to convert said femtosecond pulses of said laser signal into coded words;
   a second grating to spectrally recombine said coded words of said laser signal;
   a launching telescope to launch said laser signal;
   a receiving telescope to receive said laser signal;
   a second laser to generate a set of reference pulses;
   a non-linear crystal to combine said set of reference pulses and said laser signal so as to create an output signal only when said laser signal and said reference pulses temporally coincide; and
   a detector to record said output signal.

2. The system of claim 1 wherein said first laser generates said laser signal at a rate greater than 10 MHz.

3. The system of claim 1 wherein quasi periodic sequences generate third-harmonics of said laser signal.

4. The system of claim 1 wherein said laser signal is guided between said launching telescope and said receiving telescope by a plurality of filaments created by intense ultrashort laser pulses.

5. The system of claim 4 wherein a spinning window deflects said plurality of filaments.

6. The system of claim 4 wherein a liquid jet deflects said plurality of filaments.

* * * * *